US010142970B2

(12) United States Patent
Tiwari et al.

(10) Patent No.: US 10,142,970 B2
(45) Date of Patent: Nov. 27, 2018

(54) RLC RECONFIGURATION DURING CELL RESELECTION

(71) Applicant: Nokia Solutions and Networks Oy, Espoo (FI)

(72) Inventors: Bindhya Vashini Tiwari, Vantaa (FI); Sheyam Lal Dhomeja, Espoo (FI)

(73) Assignee: Nokia Solutions and Networks Oy, Espoo (FI)

( * ) Notice: Subject to any disclaimer, the term of this patent is extended or adjusted under 35 U.S.C. 154(b) by 0 days.

(21) Appl. No.: 15/308,742

(22) PCT Filed: May 5, 2014

(86) PCT No.: PCT/EP2014/059076
§ 371 (c)(1),
(2) Date: Nov. 3, 2016

(87) PCT Pub. No.: WO2015/169332
PCT Pub. Date: Nov. 12, 2015

(65) Prior Publication Data
US 2017/0180146 A1 Jun. 22, 2017

(51) Int. Cl.
*H04W 72/04* (2009.01)
*H04W 28/18* (2009.01)
(Continued)

(52) U.S. Cl.
CPC ..... *H04W 72/0406* (2013.01); *G06F 11/1425* (2013.01); *H04L 41/5025* (2013.01);
(Continued)

(58) Field of Classification Search
None
See application file for complete search history.

(56) References Cited

U.S. PATENT DOCUMENTS 7,194,277 B2 * 3/2007 Farnsworth ............. H04W 4/12
455/422.1
7,254,144 B2 * 8/2007 Kuo ..................... H04W 76/046
370/331

(Continued)

OTHER PUBLICATIONS

3GPP TSG-RAN WG2 Meeting #48, R2-051903, London, United Kingdom, Aug. 29-Sep. 2, 2005, "Cell update during reconfiguration procedure", Motorola, 25 pgs.
(Continued)

*Primary Examiner* — Gregory B Sefcheck
(74) *Attorney, Agent, or Firm* — Harrington & Smith (57) ABSTRACT

It is provided a method, including detecting whether or not a terminal has completed a reconfiguration of a radio bearer based on a first reconfiguration message, wherein the first reconfiguration message provides a first configuration of a first radio bearer in a first cell; detecting whether or not a cell update message is received from the terminal, wherein the cell update message indicates that the terminal has performed a cell update from the first cell to a second cell different from the first cell; triggering, if the terminal has not completed the reconfiguration and the cell update message is received, providing a second reconfiguration message to the terminal, wherein the second reconfiguration message provides a second configuration of a second radio bearer in the second cell.

18 Claims, 5 Drawing Sheets

(51) Int. Cl.
*H04W 48/20* (2009.01)
*G06F 11/14* (2006.01)
*H04L 12/24* (2006.01)
*H04W 36/00* (2009.01)
*H04W 48/18* (2009.01)
*H04W 60/00* (2009.01)
*H04W 76/27* (2018.01)
*H04W 60/04* (2009.01)

(52) U.S. Cl.
CPC ....... *H04W 28/18* (2013.01); *H04W 36/0055* (2013.01); *H04W 48/18* (2013.01); *H04W 48/20* (2013.01); *H04W 60/005* (2013.01); *H04W 72/046* (2013.01); *H04W 60/04* (2013.01); *H04W 76/27* (2018.02)

(56) References Cited

U.S. PATENT DOCUMENTS

| | | | | |
|---|---|---|---|---|
| 7,389,108 B2 * | 6/2008 | Pedlar | .................... | H04W 60/04 370/254 |
| 7,672,673 B2 * | 3/2010 | Kojima | ................ | H04L 1/1867 370/329 |
| 7,738,867 B2 * | 6/2010 | Norton | ................ | H04L 63/0428 370/310 |
| 7,801,527 B2 * | 9/2010 | Putcha | ................ | H04W 76/028 455/425 |
| 7,826,617 B2 * | 11/2010 | Funnell | .................. | H04L 47/34 380/247 |
| 8,068,451 B2 * | 11/2011 | Wu | ........................ | H04W 12/02 370/328 |
| 8,175,275 B2 * | 5/2012 | Funnell | .................. | H04L 47/34 380/273 |
| 8,320,918 B2 * | 11/2012 | Lee | ........................ | H04W 36/32 455/435.1 |
| 8,447,316 B2 * | 5/2013 | Martin | .................. | H04W 72/02 370/329 |
| 8,599,874 B2 * | 12/2013 | Pedlar | .................... | H04L 45/00 370/322 |
| 8,730,989 B2 * | 5/2014 | Pelletier | ............... | H04B 7/0404 370/252 |
| 8,774,104 B2 * | 7/2014 | Pelletier | ............... | H04W 72/12 370/329 |
| 8,805,395 B2 * | 8/2014 | Ke | ...................... | H04W 76/028 455/452.1 |
| 9,071,433 B2 * | 6/2015 | Sheik | .................... | H04L 1/1858 |
| 9,270,706 B2 * | 2/2016 | McGann | ............... | H04L 63/205 |
| 9,544,942 B2 * | 1/2017 | Kanamarlapudi | .... | H04L 1/1858 |
| 2005/0101299 A1 | 5/2005 | Farnsworth | ................ | 455/412.1 |
| 2006/0246883 A1 | 11/2006 | Putcha | .......................... | 455/419 |
| 2013/0215831 A1 * | 8/2013 | Pang | ..................... | H04L 1/0004 370/328 |

OTHER PUBLICATIONS

3GPP TS 25.331 V8.24.0 (Dec. 2013), $3^{rd}$ Generation Partnership Project; Technical Specification Group Radio Access Network; Radio Resource Control (RRC); Protocol specification (Release 8), paragraphs 8.3.1.1.-8.3.1.7., 30 pgs.

* cited by examiner

RLC RECONFIGURATION DURING CELL RESELECTION

FIELD OF THE INVENTION

The present invention relates to an apparatus, a method, and a computer program product related to mobile communication. More particularly, the present invention relates to an apparatus, a method, and a computer program product related to cell reselection.

BACKGROUND OF THE INVENTION

| Abbreviations | |
|---|---|
| 3GPP | 3$^{rd}$ generation Partnership Project |
| AM | Acknowledge Mode |
| CDMA | Code Division Multiple Access |
| Cell_DCH | Cell_Dedicated Channel |
| Cell_PCH | Cell_Paging Channel |
| C-RNTI | Cell RNTI |
| DL | Downlink |
| EDGE | Enhanced Datarate for GSM Evolution |
| eNB | Evolved NodeB |
| E-DCH | Enhanced Dedicated Channel |
| E-FACH | Enhanced FACH |
| E-RACH | Enhanced RACH |
| E-RNTI | E-DCH RNTI |
| E-UTRA | Evolved Universal Terrestrial Radio Access |
| FACH | Forward Access Channel |
| GPRS | General Packet Radio Service |
| GSM | Global System for Mobile Communication |
| H-RNTI | HS-DSCH RNTI |
| HS-DSCH | High Speed Downlink Shared Channel |
| HSPA | High Speed Packet Access |
| LTE | Long Term Evolution |
| LTE-A | LTE Advanced |
| NodeB | Base station of UTRAN |
| PDU | Packet Data Unit |
| RACH | Random Access Channel |
| RB | Radio Bearer |
| RLC | Radio Link Control |
| RNC | Radio Network Controller |
| RNTI | Radio Network Temporary Identifier |
| RRC | Radio Resource Control |
| TS | Technical Specification |
| UE | User Equipment |
| UL | Uplink |
| URA-PCH | UMTS Radio Access_Paging Channel |
| UTRAN | Universal Terrestrial Radio Access Network |
| WiFi | Wireless Fidelity |

3GPP release 7 introduced the enhanced FACH and release 8 introduced the enhanced RACH feature, thus allowing UE and UTRAN to use HSPA channels (in Cell_FACH state) in uplink and downlink directions to improve end user experience. If both the UE and the UTRAN support E-FACH (release 7) or E-RACH/E-FACH (release 8), then UTRAN provides the corresponding Radio Bearer (RB) Mapping for each established Radio Bearer and other parameters to the UE, to allow user plane to work in Cell_FACH state. UTRAN also provides corresponding RLC configuration for E-RACH in UL or E-FACH in DL for the data RB and the transport channel configuration in a dedicated RRC message.

Figure 1:
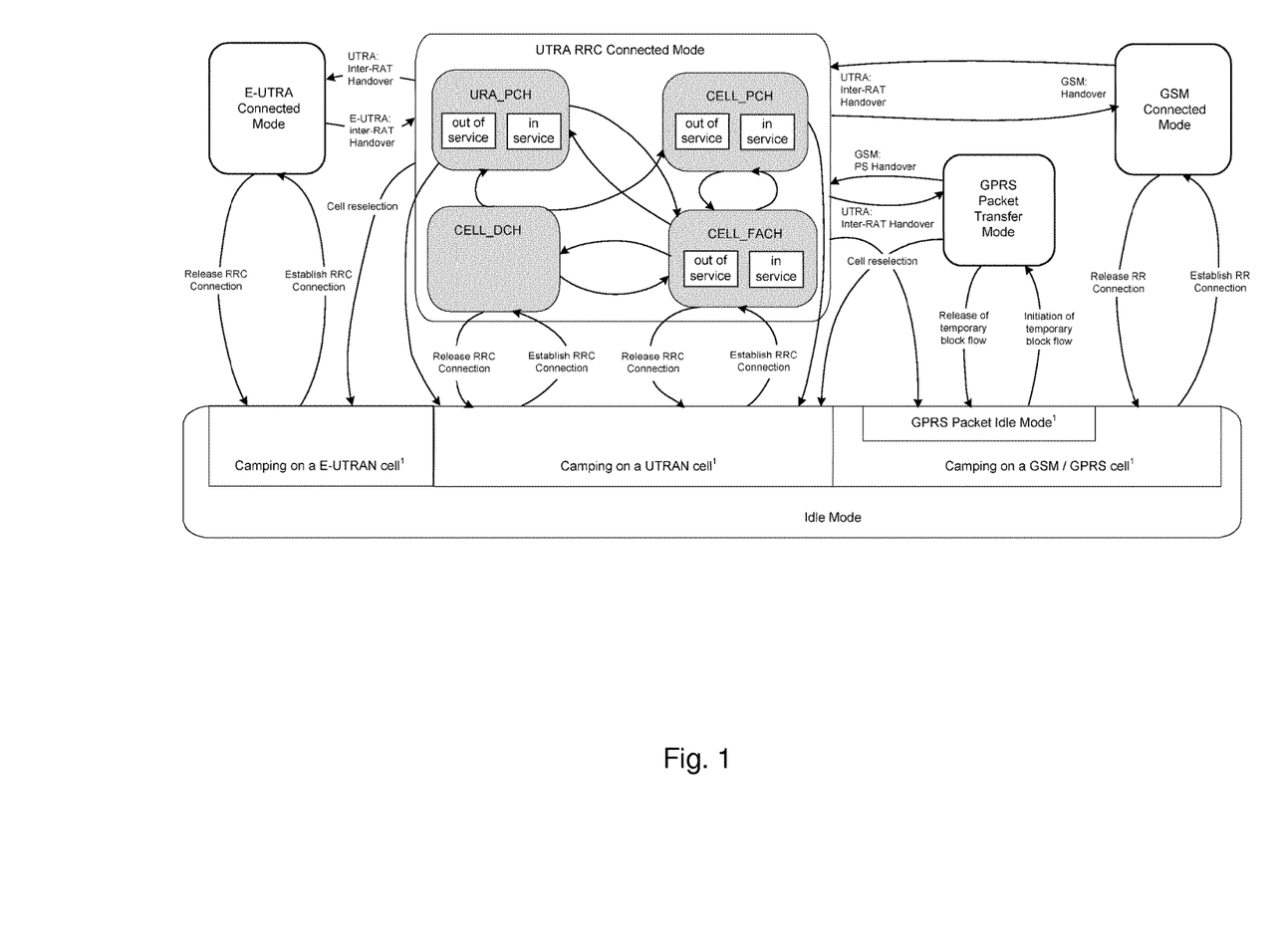
FIG. 1 shows RRC states and states transitions (taken from 3GPP TS 25.331)

UTRAN is allowed to perform further state transitions from Cell_FACH to Cell_DCH/Cell_PCH/URA_PCH, all of them being in the RRC connected mode. Details on these states and their transitions are given in 3GPP TS 25.331. FIG. 1, taken from 3GPP TS 25.331, V8.24.0, shows the states and their transitions for 3GPP release 8, section 7.1, and also their transitions to idle mode (shown at the bottom of FIG. 1) and inter-RAT transitions to/from E-UTRA, GSM, and GPRS. The RRC connection is defined as a point-to-point bi-directional connection between RRC peer entities in the UE and the UTRAN characterised by the allocation of a U-RNTI. A UE has either zero or one RRC connection.

The Forward Access Channel (FACH) is a downlink transport channel that carries control information to terminals known to be located in the given cell. This is used, for example, after a random access message has been received by the base station. It is also possible to transmit packet data on the FACH. There may be more than one FACH in a cell. The FACH does not use fast power control, and the messages transmitted need to include in-band identification information to ensure their correct receipt. The FACH is a downlink channel with low rate payload.

RACH is a shared channel that is used by terminals to access the access network especially for initial access and bursty data transmission.

According to 3GPP TS 25.331, when a user initiates a call an RRC CONNECTION REQUEST message is sent by the UE to the network to trigger the establishment of a radio resource control connection. The network then assigns radio resources to the UE and sends an RRC CONNECTION SETUP message to direct the UE to properly configure its signaling radio bearers. After the UE has configured its radio resource control connection, the UE sends an RRC CONNECTION SETUP COMPLETE message to the network. After the network receives the message that the radio resource control connection is properly configured, the network sends a RADIO BEARER SETUP message to direct the UE to properly configure its user radio bearers. Once the user radio bearers are properly configured, the UE sends a RADIO BEARER SETUP COMPLETE message to the network. Because this message is sent in Radio Link Control (RLC) acknowledgement mode, the network sends an RLC protocol layer ACK to the UE upon reception of the RADIO BEARER SETUP COMPLETE message.

If a radio link failure, such as a signal fade or excessive signal noise, occurs during or after the RRC layer in the UE submits a RADIO BEARER SETUP COMPLETE message to its lower layers for transmission to the network, the network will not receive the RADIO BEARER SETUP COMPLETE message and the network will not send an RLC layer ACK. Upon radio link failure, the UE will send a CELL UPDATE message with a cause of "radio link failure." Because the network did not receive a RADIO BEARER SETUP COMPLETE message from the UE, the network will assume that the UE failed to properly configure its radio bearers in accordance with the earlier RADIO BEARER SETUP message from the network. This could lead to the network and the UE getting out of sync with respect to the configurations used at their respective ends-eventually leading to a call drop.

US 2006/246883 discuss a case of cell reselection during RLC reconfiguration. According to this prior art, either the previous or the new RLC configuration is used after cell update from a first cell to a second cell by both the UE and the network. It does not consider a case of different capabilities in the first cell and the second cell.

SUMMARY OF THE INVENTION

It is an object of the present invention to improve the prior art.

According to a first aspect of the invention, there is provided an apparatus, comprising reconfiguration detecting means adapted to detect whether or not a terminal has completed a reconfiguration of a radio bearer based on a first reconfiguration message, wherein the first reconfiguration message provides a first configuration of a first radio bearer in a first cell; cell update detecting means adapted to detect whether or not a cell update message is received from the terminal, wherein the cell update message indicates that the terminal has performed a cell update from the first cell to a second cell different from the first cell; triggering means adapted to trigger, if the terminal has not completed the reconfiguration and the cell update message is received, providing a second reconfiguration message to the terminal, wherein the second reconfiguration message provides a second configuration of a second radio bearer in the second cell.

The reconfiguration detecting means may be adapted to detect that the terminal has not completed the reconfiguration if it detects a set reconfiguration status indicator in the cell update message.

The reconfiguration detecting means may be adapted to detect that the terminal has not completed the reconfiguration if it detects that a response message to the first reconfiguration message has not been received when the cell update message is received.

The apparatus may further comprise capability deciding means adapted to decide on a first capability of the first cell and a second capability of the second cell; trigger inhibiting means adapted to inhibit the triggering means from triggering if the first capability is the same as the second capability.

The apparatus may further comprise confirming means adapted to provide a cell update confirm message in response to the cell update message; configuration inhibiting means adapted to inhibit the apparatus from providing the second configuration in the cell update confirm message.

The apparatus may further comprise completion detecting means adapted to detect if a completion message indicating that the cell update is completed is received; preventing means adapted to prevent the triggering means from triggering before the completion message is received.

The first configuration and the second configuration may be radio link control configurations.

The apparatus may further comprise stopping means adapted to stop, if the terminal has not completed the reconfiguration and the cell update message is received, a data transmission to the terminal; response detecting means adapted to detect whether or not a response to the second reconfiguration message is received, wherein the response indicates that the second configuration is established; stop inhibiting means adapted to inhibit the stopping means from stopping if it is detected that the response is received.

The apparatus may further comprise deciding means adapted to decide, based on the first configuration and the second configuration, if a ciphering has to be reconfigured for the terminal; triggering means adapted to trigger, if it is decided that the ciphering has to be reconfigured, a reconfiguration of the ciphering if it is detected that the response is received.

According to a second aspect of the invention, there is provided an apparatus, comprising reconfiguration detecting circuitry configured to detect whether or not a terminal has completed a reconfiguration of a radio bearer based on a first reconfiguration message, wherein the first reconfiguration message provides a first configuration of a first radio bearer in a first cell; cell update detecting circuitry configured to detect whether or not a cell update message is received from the terminal, wherein the cell update message indicates that the terminal has performed a cell update from the first cell to a second cell different from the first cell; triggering circuitry configured to trigger, if the terminal has not completed the reconfiguration and the cell update message is received, providing a second reconfiguration message to the terminal, wherein the second reconfiguration message provides a second configuration of a second radio bearer in the second cell.

The reconfiguration detecting circuitry may be configured to detect that the terminal has not completed the reconfiguration if it detects a set reconfiguration status indicator in the cell update message.

The reconfiguration detecting circuitry may be configured to detect that the terminal has not completed the reconfiguration if it detects that a response message to the first reconfiguration message has not been received when the cell update message is received.

The apparatus may further comprise capability deciding circuitry configured to decide on a first capability of the first cell and a second capability of the second cell; trigger inhibiting circuitry configured to inhibit the triggering circuitry from triggering if the first capability is the same as the second capability.

The apparatus may further comprise confirming circuitry configured to provide a cell update confirm message in response to the cell update message; configuration inhibiting circuitry configured to inhibit the apparatus from providing the second configuration in the cell update confirm message.

The apparatus may further comprise completion detecting circuitry configured to detect if a completion message indicating that the cell update is completed is received; preventing circuitry configured to prevent the triggering circuitry from triggering before the completion message is received.

The first configuration and the second configuration may be radio link control configurations.

The apparatus may further comprise stopping circuitry configured to stop, if the terminal has not completed the reconfiguration and the cell update message is received, a data transmission to the terminal; response detecting circuitry configured to detect whether or not a response to the second reconfiguration message is received, wherein the response indicates that the second configuration is established; stop inhibiting circuitry configured to inhibit the stopping circuitry from stopping if it is detected that the response is received.

The apparatus may further comprise deciding circuitry configured to decide, based on the first configuration and the second configuration, if a ciphering has to be reconfigured for the terminal; triggering circuitry configured to trigger, if it is decided that the ciphering has to be reconfigured, a reconfiguration of the ciphering if it is detected that the response is received.

According to a third aspect of the invention, there is provided a method, comprising detecting whether or not a terminal has completed a reconfiguration of a radio bearer based on a first reconfiguration message, wherein the first reconfiguration message provides a first configuration of a first radio bearer in a first cell; detecting whether or not a cell update message is received from the terminal, wherein the cell update message indicates that the terminal has performed a cell update from the first cell to a second cell different from the first cell; triggering, if the terminal has not completed the reconfiguration and the cell update message is received, providing a second reconfiguration message to the terminal, wherein the second reconfiguration message provides a second configuration of a second radio bearer in the second cell.

In the method, it may be detected that the terminal has not completed the reconfiguration if a set reconfiguration status indicator is detected in the cell update message.

In the method, it may be detected that the terminal has not completed the reconfiguration if it is detected that a response message to the first reconfiguration message has not been received when the cell update message is received.

The method may further comprise deciding on a first capability of the first cell and a second capability of the second cell; inhibiting the triggering of the providing of the second configuration message if the first capability is the same as the second capability.

The method may further comprise providing a cell update confirm message in response to the cell update message; inhibiting an apparatus performing the method from providing the second configuration in the cell update confirm message.

The method may further comprise detecting if a completion message indicating that the cell update is completed is received; preventing the triggering of the providing of the second configuration message before the completion message is received.

The first configuration and the second configuration may be radio link control configurations.

The method may further comprise stopping, if the terminal has not completed the reconfiguration and the cell update message is received, a data transmission to the terminal; detecting whether or not a response to the second reconfiguration message is received, wherein the response indicates that the second configuration is established; inhibiting the stopping if it is detected that the response is received.

The method may further comprise deciding, based on the first configuration and the second configuration, if a ciphering has to be reconfigured for the terminal; triggering, if it is decided that the ciphering has to be reconfigured, a reconfiguration of the ciphering if it is detected that the response is received.

The method may be a method of radio link control reselection.

According to a fourth aspect of the invention, there is provided a computer program product comprising a set of instructions which, when executed on an apparatus, is configured to cause the apparatus to carry out the method according to the third aspect. The computer program product may be embodied as a computer-readable medium or directly loadable into a computer.

According to some embodiments of the invention, at least one of the following advantages may be achieved:
call drops are reduced;
user experience is improved;
UE is not affected;
the solution is backwards compatible;
the solution is based on existing commands and information elements;
the solution may be employed individually per network element without synchronization with other network elements; and
there is no need to standardize the solution.

It is to be understood that any of the above modifications can be applied singly or in combination to the respective aspects to which they refer, unless they are explicitly stated as excluding alternatives.

BRIEF DESCRIPTION OF THE DRAWINGS

Further details, features, objects, and advantages are apparent from the following detailed description of the preferred embodiments of the present invention which is to be taken in conjunction with the appended drawings, wherein.

DETAILED DESCRIPTION OF CERTAIN EMBODIMENTS

Herein below, certain embodiments of the present invention are described in detail with reference to the accompanying drawings, wherein the features of the embodiments can be freely combined with each other unless otherwise described. However, it is to be expressly understood that the description of certain embodiments is given for by way of example only, and that it is by no way intended to be understood as limiting the invention to the disclosed details.

Moreover, it is to be understood that the apparatus is configured to perform the corresponding method, although in some cases only the apparatus or only the method are described.

If during state transition procedure, a UE supporting E-RACH in UL and E-FACH in DL or only E-FACH in DL reselects to a cell with different capabilities, then UE needs to have the RB mapping and RLC configuration as soon as the state transition and cell reselection procedure is completed so that it can continue the data transfer.

If during ongoing reconfiguration procedure, the UE moves to a cell with different capability, then UTRAN cannot provide the needed RLC configuration, radio bearer mapping and the transport channel configuration parameters until the cell reselection procedure is over, but UE may need to have these parameters to be able to complete the procedure successfully.

Since radio bearer mapping can be provided in advance to the UE, it is possible that UTRAN can give all possible mapping options to the UE taking its capabilities and UE capabilities into account, even though this would increase the size of signalling RRC message during reconfiguration procedures. This will still not be sufficient to cater the scenario of cell reselection during ongoing reconfiguration procedure since UE would still need the RLC configuration according to the selected mapping option. Conventionally, there is no way how the network can provide all possible RLC configuration parameters for UL and DL and for each radio bearer established in the UE.

This limitation leads to call drop and bad end-user experience during UE mobility. For example, a call drop will occur during UE cell reselection between a cell with enhanced-FACH configuration and a cell with release 99 configuration where E-FACH is not configured.

Note that RLC reconfiguration is just one example of RRC (re-)configuration. E.g. UTRAN may send a reconfiguration message (RRC: RADIO BEARER RECONFIGURATION) to reconfigure the RB mapping parameters, RLC configuration, transport channel configuration (add/ delete/modify). Modification of RLC is just one possible option. In the present description, the term "reconfiguration" is to be considered as any kind of RRC (re-) configuration, if not otherwise made clear from the context.

3GPP TS 25.331 does not consider any case where UE could have mobility between different cells with different capabilities and UE may require the corresponding RLC parameters during ongoing reconfiguration, though it is said in the same specification that UE should reject the CELL UPDATE CONFIRM from the network with cause "incompatible simultaneous reconfiguration" if UE receives reconfiguration parameters in the message and UE has already reconfiguration procedure ongoing.

According to embodiments of the invention, the network (also named UTRAN, which may be represented by e.g. base station (NodeB), controller (RNC), or a combination of both), provides the new RLC configuration after completion of the cell update procedure. The UE does not need to request the new RLC configuration explicitly or implicitly, e.g. by error messages.

When a UE receives CELL UPDATE CONFIRM from the UTRAN in response to CELL UPDATE, it checks if it has possible RB mapping options and transport channel configuration to be able to complete the cell update procedure. Once the UE transmits the response message to CELL UPDATE CONFIRM (note that there may be different options for the response message), it then sends the response to the ongoing—reconfiguration procedure. Since UE has completed the cell update procedure before it transmits the response to ongoing reconfiguration procedure, UTRAN may provide the needed RLC configuration according to the newly selected configuration as a result of the cell reselection after the completion of cell update procedure.

In this way, UTRAN is able to provide the needed RLC configuration as soon as the previously ongoing cell update procedure is completed without letting UE to initiate a failure procedure or the drop of the call due to CELL UPDATE—CELL UPDATE CONFIRM message loop.

Figure 6:
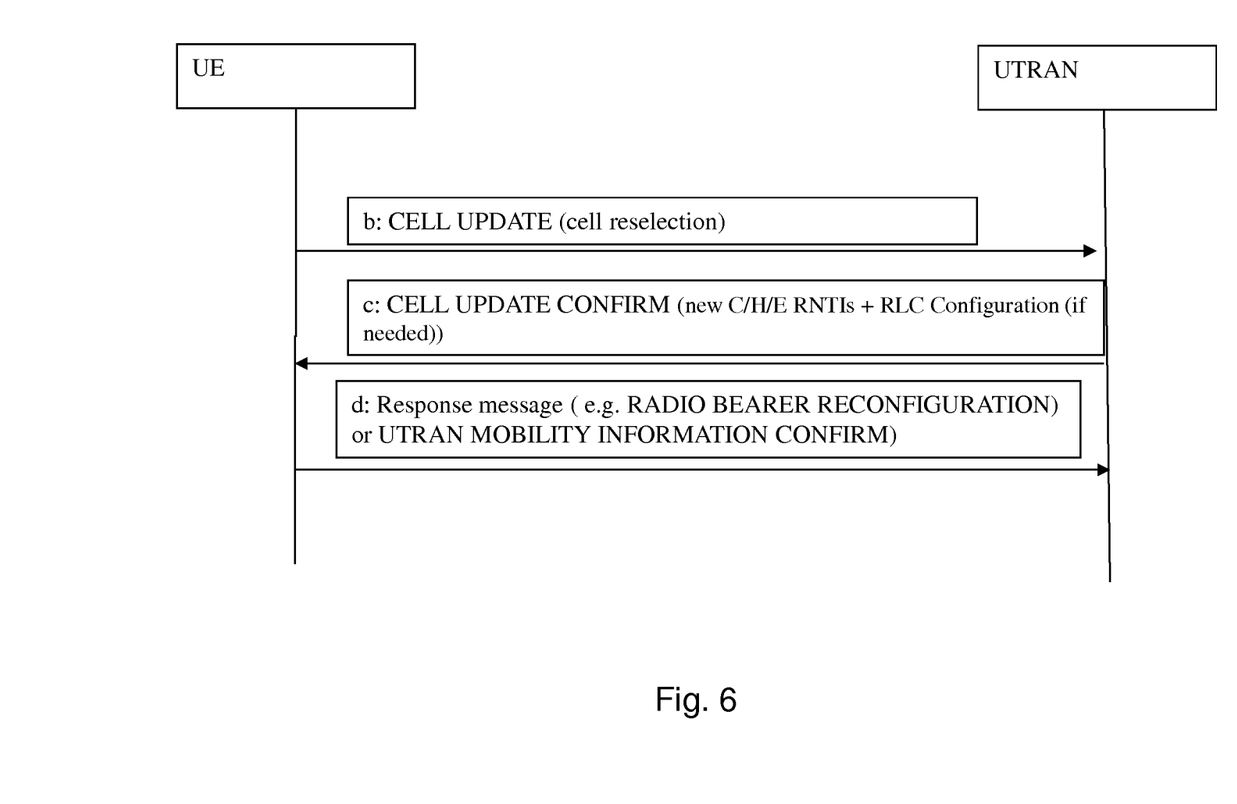
FIG. 6 shows a conventional cell update procedure.

More in detail, a method according to embodiments of the invention may be described by comparing the steps according to a conventional method with those of an embodiment of the invention:

Cell update procedure without previously ongoing reconfiguration procedure (legacy procedure, FIG. 6):

Step b: When the UE in Cell_FACH/Cell_PCH reselects to new cell, the UE initiates cell update procedure.

Step c: If the new cell has different capability than the previous serving cell, UE will need the new configuration to be able to complete the cell update procedure. "New configuration" referred here means that UE will need RB Mapping information for each radio bearer needed by UE. Furthermore, UE will also need the new RLC configuration parameters for each RB to continue data transmission normally after completion of cell update procedure. It is assumed in this embodiment that UE has the needed RB mapping information already stored and it needs only RLC configuration. Usually, if the serving cell and the target cell have different capabilities and there is no previously started reconfiguration procedure, UTRAN may provide the new configuration parameters to the UE during the cell update procedure i.e. in the CELL UPDATE CONFIRM message (together with e.g. new C-RNTI, H-RNTI, and/or E-RNTI).

Step d: After receiving CELL UPDATE CONFIRM, UE takes new configuration parameters and transmits appropriate response message to the UTRAN. The procedure is then completed in both UE and UTRAN.

Figure 7:
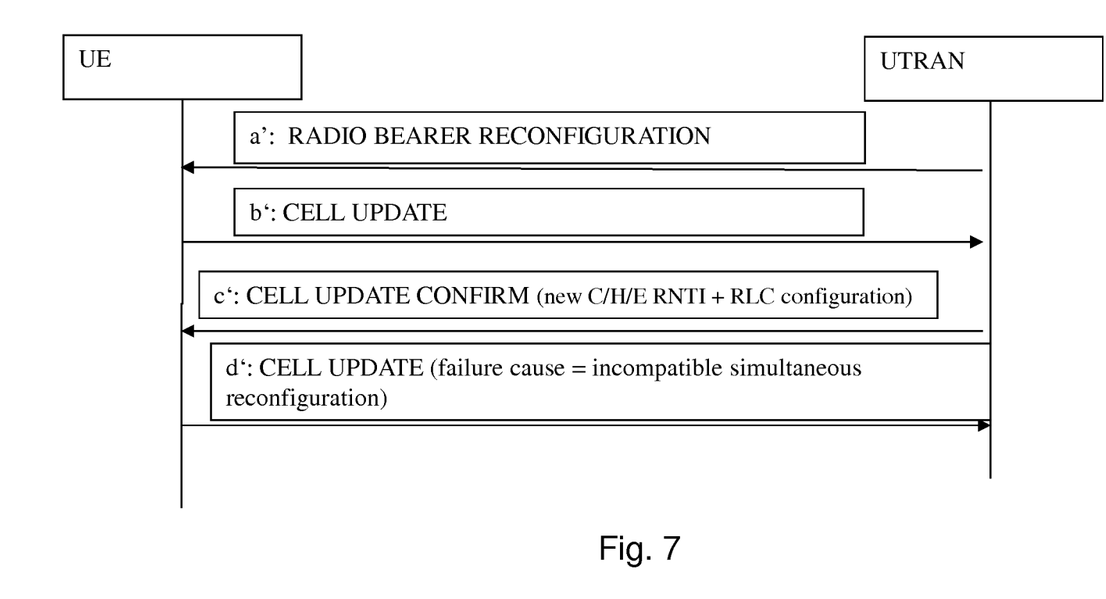
FIG. 7 shows a conventional cell update procedure with RLC reconfiguration.

For comparison, a conventional cell update procedure during ongoing reconfiguration procedure is described with reference to FIG. 7:

Step a': UTRAN initiates a reconfiguration procedure for a UE in Cell_FACH or to perform state transition to Cell_FACH by sending a RRC message to the UE (e.g. RADIO BEARER RECONFIGURATION). Upon receiving this RRC message, UE updates its internal flag to indicate that a reconfiguration procedure has been started. UE starts to process the message. UE does not accept any new reconfiguration procedure until this ongoing reconfiguration procedure is completed and flag has been reset.

Step b': If the UE moves to a new cell during this ongoing reconfiguration procedure in Cell_FACH state, the UE initiates cell update procedure. This step is the same as step b in the previously described conventional procedure.

Step c': To complete the procedure (comprising cell update and reconfiguration) successfully, UE will need the configuration parameters of the new cell. Conventionally, UTRAN sends these configuration parameters in the CELL UPDATE CONFIRM message (together with e.g. new C-RNTI, H-RNTI, and/or E-RNTI). This step is the same as step c in the previously described conventional procedure.

Step d': Since there is ongoing reconfiguration procedure, UE cannot accept the new configuration parameters. Accordingly, UE sends an error message with failure cause="incompatible simultaneous reconfiguration".

Thus, conventionally, when UE triggered cell update procedure during ongoing reconfiguration, UTRAN must wait for the completion of reconfiguration procedure, that will be completed by the UE after it has first completed the cell update procedure.

According to some embodiments of the invention, UTRAN sends the CELL UPDATE CONFIRM message of step c' without including the new RLC parameters. The UE ignores the absence of RLC parameters for the time being because they are not required immediately by the UE to be able to complete the cell update procedure.

Due to the absence of RLC configuration parameters in the CELL UPDATE CONFIRM message, the UE is able to complete the cell update procedure and thus it can also complete the previously ongoing reconfiguration procedure immediately. According to embodiments of the invention, UTRAN may trigger a new reconfiguration procedure at this point and send the new RLC parameters.

Figure 2:
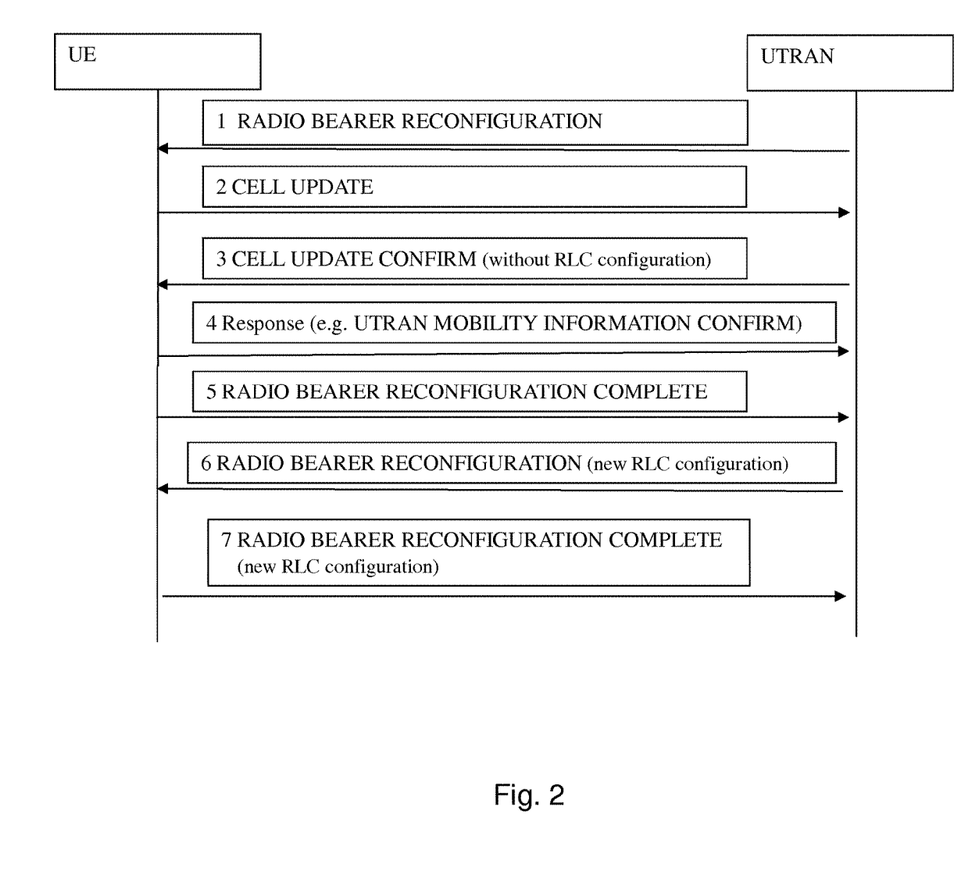
FIG. 2 shows a method according to an embodiment of the invention.

FIG. 2 shows a method according to an embodiment of the invention.

In step 1, UTRAN sends a reconfiguration message to UE. Such a reconfiguration message may be a RLC reconfiguration message such as "Change from CELL_PCH to CELL_FACH" with the corresponding RB mapping. The reconfiguration message is based on the capabilities of the cell the UE is currently connected to ("first cell").

Before UTRAN receives a confirmation of the reconfiguration from the UE, UTRAN receives a CELL UPDATE message (step 2) indicating that the UE performs a cell update to a second cell different from the first cell. The cell update message may comprise an indicator such as a flag "reconfiguration status indicator", indicating that the reconfiguration is still ongoing. Thus, UTRAN may consider that the reconfiguration is still ongoing when the cell update is performed due to either or both of the indicator and the response to the reconfiguration message of step 1 being missing.

UTRAN replies to the CELL UPDATE message from the UE by a CELL UPDATE CONFIRM message (step 3). UTRAN may know that the new cell ("second cell") has different capabilities than the first cell. In this case, it may not include the new RLC configuration parameters (those relevant for the second cell, based on the capabilities of the second cell) into the CELL UPDATE CONFIRM message.

The reason is as follows:

If the RLC parameters were included in the CELL UPDATE CONFIRM, UE would not be able to process the received message. Addition of RLC configuration parameters into CELL UPDATE CONFIRM message will cause these parameters to be handled as a reconfiguration message. If UE receives a CELL UPDATE CONFIRM message and notices that there are new RLC configuration parameters while another reconfiguration procedure is ongoing, the UE will reject the new reconfiguration attempt from the UTRAN. Therefore, according to some embodiments of the invention, UTRAN excludes the RLC parameters from the CELL UPDATE CONFIRM message so that UE does not treat this message as—reconfiguration message.

If UTRAN does not provide the new RLC configuration parameters in the CELL UPDATE CONFIRM message, it will remember internally that RLC configuration is pending.

After UTRAN received the successful response for CELL UPDATE CONFIRM (step 4), and knowing that ongoing reconfiguration procedure has completed in the UE, it may send a new reconfiguration message to the UE including the new RLC configuration parameters (step 6). UTRAN may send the new reconfiguration message without being triggered by e.g. an error message or a request from the UE.

The responses to the reconfiguration messages of steps 1 and 6 are received in steps 5 and 7, respectively. The sequence of steps 5 and 6 may be interchanged. This is particularly feasible if it is assumed that the UE will transmit the RECONFIGURATION RESPONSE message to the RECONFIGURATION message of step 1 immediately after completion of the cell update procedure.

Note that FIG. 2 does not show the signaling inside the RRC state for a RRC procedure.

The procedures are described hereinabove under the assumption that UTRAN provides the RB mapping information in advance to the UE. However, this is not mandatory. The RB mapping information may be provided at any time before, during or after the procedure, provided that it is available when it is needed. Providing RB mapping information may be performed e.g. in any conventionally known way. In some embodiments, RB mapping is predefined in UE such that no RB mapping information has to be provided by UTRAN.

In some embodiments of the invention, UTRAN stops the DL data transmission if cell update is performed during RLC reconfiguration until the response message for the new RLC configuration command has been received. Data transmission may be resumed after receipt of the response message.

In some embodiments of the invention, if there is a need for RLC re-establishment due to a change of RLC size in UL or DL or both, after receiving a reconfiguration response message indicating success of the reconfiguration, UTRAN may reconfigure ciphering for the reconfigured RLC. Data transmission may be resumed after reconfiguration of ciphering.

It is favourable if the UE will not start transmitting any data until it has received the new RLC reconfiguration parameters after completion of the previous reconfiguration and cell update procedures. From UTRAN side, UTRAN may suspend all data transfer in DL on the data RB, including sending of RLC acknowledgment for received PDUs in UL, until the new RLC configuration has been provided to UE. Because the change in the RLC configuration and selection of new RB mapping may result in an RLC re-establishment, UTRAN will indicate that to the UE in the reconfiguration message so that UE will perform the procedure and re-establish the corresponding RLC entity in its side.

Figure 3:
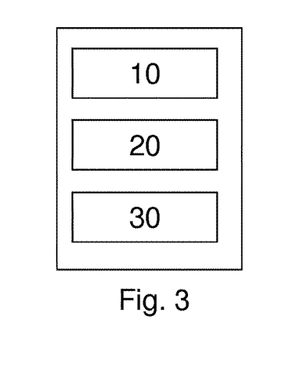
FIG. 3 shows an apparatus according to an embodiment of the invention.
Figure 4:
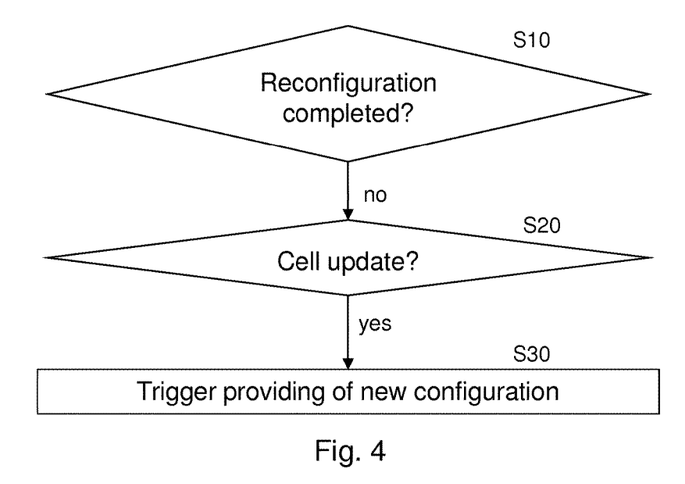
FIG. 4 shows a method according to an embodiment of the invention.

FIG. 3 shows an apparatus according to an embodiment of the invention. The apparatus may be a network element such as a base station or a controller or a combination of base station and controller, or an element thereof. FIG. 4 shows a method according to an embodiment of the invention. The apparatus according to FIG. 3 may perform the method of FIG. 4 but is not limited to this method. The method of FIG. 4 may be performed by the apparatus of FIG. 3 but is not limited to being performed by this apparatus.

The apparatus comprises reconfiguration detecting means 10, cell update detecting means 20, and triggering means 30.

The reconfiguration detecting means 10 detects whether or not a terminal has completed a reconfiguration of a radio bearer (S10). The reconfiguration is based on a first reconfiguration message, which provides a first configuration of a first radio bearer in a first cell. The first reconfiguration message is provided to the terminal when the terminal is connected to the first cell.

The cell update detecting means 20 detects whether or not a cell update message is received (S20). The cell update message indicates that the terminal has performed a cell update from the first cell to a second cell different from the first cell.

In different embodiments of the invention, steps S10 and S20 may be performed one after the other (S20 after S10 or S10 after S20), or parallel to each other.

If the terminal has not completed the reconfiguration (S10="no") and the cell update message is received (S20="yes"), the triggering means 30 triggers providing a second reconfiguration message to the terminal (S30). The second reconfiguration message provides a second configuration of a second radio bearer in the second cell. The triggering means 30 may be adapted to provide the second configuration message only after it has received a message (such as "cell update response") that the cell update procedure is completed.

Figure 5:
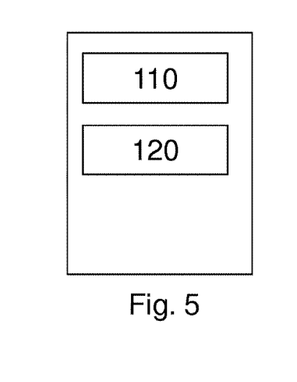
FIG. 5 shows an apparatus according to an embodiment of the invention.

FIG. 5 shows an apparatus according to an embodiment of the invention. The apparatus comprises at least one processor 110, at least one memory 120 including computer program code, and the at least one processor, with the at least one memory and the computer program code, being arranged to cause the apparatus to at least perform at least the method according to FIG. 4.

Embodiments of the invention may be employed in a UTRAN network. They may be employed also in other mobile networks such as CDMA, EDGE, LTE, LTE-A, WiFi networks, etc.

Embodiments of the invention may be employed within the network. For example, they may be employed in a base station such as a NodeB or an eNodeB, in a controller such as a RNC, or they may be distributed over a base station and a controller.

A terminal may be a user equipment such as a mobile phone, a smart phone, a PDA, a laptop, a tablet PC, or any other device which may be connected to the respective mobile network.

One piece of information may be transmitted in one or plural messages from one entity to another entity. Each of these messages may comprise further (different) pieces of information.

Names of network elements, protocols, and methods are based on current standards. In other versions or other technologies, the names of these network elements and/or protocols and/or methods may be different, as long as they provide a corresponding functionality.

If not otherwise stated or otherwise made clear from the context, the statement that two entities are different means that they perform different functions. It does not necessarily mean that they are based on different hardware. That is, each of the entities described in the present description may be based on a different hardware, or some or all of the entities may be based on the same hardware. It does not necessarily mean that they are based on different software. That is, each of the entities described in the present description may be based on different software, or some or all of the entities may be based on the same software.

According to the above description, it should thus be apparent that exemplary embodiments of the present invention provide, for example a network element, e.g. a base station such as a NodeB or an eNodeB, a controller such as a RNC, a combination of a base station and a controller, or a component thereof, an apparatus embodying the same, a method for controlling and/or operating the same, and computer program(s) controlling and/or operating the same as well as mediums carrying such computer program(s) and forming computer program product(s).

Implementations of any of the above described blocks, apparatuses, systems, techniques or methods include, as non limiting examples, implementations as hardware, software, firmware, special purpose circuits or logic, general purpose hardware or controller or other computing devices, or some combination thereof.

It is to be understood that what is described above is what is presently considered the preferred embodiments of the present invention. However, it should be noted that the description of the preferred embodiments is given by way of example only and that various modifications may be made without departing from the scope of the invention as defined by the appended claims.

The invention claimed is:

1. An apparatus, comprising
at least one processor; and
at least one memory including computer program code,
the at least one memory and the computer program code configured, with the at least one processor, to cause the apparatus to perform at least the following:
send, as part of a radio resource control reconfiguration procedure for a reconfiguration of a terminal, a first reconfiguration message to the terminal to reconfigure radio resource control configuration of the terminal, wherein the first reconfiguration message provides for the terminal a first configuration of a first radio bearer in a first cell and is based on a first capability of a forward access channel of the first cell;
detect whether or not the terminal has completed the reconfiguration based on the first reconfiguration message;
receive, prior to detection of completion of the reconfiguration based on the first reconfiguration message, a cell update message from the terminal, wherein the cell update message indicates that the terminal has performed a cell update from the first cell to a second cell different from the first cell;
in response to a determination the second cell has a same capability of the forward access channel as the first capability of the forward access channel of the first cell, sending a cell update confirmation to the terminal with radio link control information for the cell update to the second cell; and
otherwise, in response to a determination the second cell has a second capability of the forward access channel different from the first capability of the forward access channel of the first cell, performing the following:
sending, in response to the terminal completing the reconfiguration and the cell update message being received, a cell update confirmation message without radio link control information for the cell update to the second cell;
sending, in response to a message from the terminal that a cell update to the second cell is confirmed, a second reconfiguration message to the terminal, wherein the second reconfiguration message provides second configuration of the second radio bearer in the second cell at least by providing the radio link control information for the cell update to the second cell.

2. The apparatus according to claim 1, wherein the detecting whether or not a terminal has completed a reconfiguration of a radio bearer based on the first reconfiguration message further comprises detecting that the terminal has not completed the reconfiguration in response to detection of a set reconfiguration status indicator in the cell update message.

3. The apparatus according to claim 1, wherein
the detecting whether or not a terminal has completed a reconfiguration of a radio bearer based on a first reconfiguration message further comprises detecting that the terminal has not completed the reconfiguration in response to it being detected that a response message to the first reconfiguration message has not been received before the cell update message is received.

4. The apparatus according to claim 1, wherein the first configuration and the second configuration are radio link control configurations.

5. The apparatus according to claim 1, wherein the at least one memory and the computer program code are configured, with the at least one processor, to cause the apparatus to perform at least the following:
detect whether or not a response to the second reconfiguration message is received, wherein the reconfiguration for the terminal in the second cell is established;
stop, in response to the terminal not completing the reconfiguration and the cell update message being received, a data transmission to the terminal;
continuing the data transmission in response to it being detected that the response to the second reconfiguration message is received.

6. The apparatus according to claim 5, wherein the at least one memory and the computer program code are configured, with the at least one processor, to cause the apparatus to perform at least the following:
decide, based on the first configuration and the second configuration, if a ciphering has to be reconfigured for the terminal;
trigger, if it is decided that the ciphering has to be reconfigured, a reconfiguration of the ciphering if it is detected that the response to the second reconfiguration message is received.

7. The method of claim 1, wherein the first capability of the first cell is enhanced-forward access channel configuration and wherein the second cell does not have the enhanced-forward access channel configured.

8. A method, comprising
sending, as part of a radio resource control reconfiguration procedure for a reconfiguration of a terminal, a first reconfiguration message to the terminal to reconfigure radio resource control configuration of the terminal, wherein the first reconfiguration messages provides for the terminal a first configuration of a first radio bearer in a first cell and is based on a first capability of a forward access channel of the first cell;

detecting whether or not the terminal has completed the reconfiguration based on the first reconfiguration message;

receiving, prior to detection of completion of the reconfiguration based on the first reconfiguration message, a cell update message from the terminal, wherein the cell update message indicates that the terminal has performed a cell update from the first cell to a second cell different from the first cell;

in response to a determination the second cell has a same capability of the forward access channel as the first capability of the forward access channel of the first cell, sending a cell update confirmation to the terminal with radio link control information for the cell update to the second cell; and otherwise, in response to a determination the second cell has a second capability of the forward access channel different from the first capability of the forward access channel of the first cell, performing the following:

sending, in response to the terminal not completing the reconfiguration and the cell update message being received, a cell update confirmation message without radio link control information for the cell update to the second cell;

sending, in response to a message from the terminal that a cell update to the second cell is confirmed, a second reconfiguration message to the terminal, wherein the second reconfiguration message provides the second configuration of the second radio bearer in the second cell at least by providing the radio link control information for the cell update to the second cell.

9. The method according to claim 8, wherein it is detected that the terminal has not completed the reconfiguration in response to a set reconfiguration status indicator being detected in the cell update message.

10. The method according to claim 8, wherein it is detected that the terminal has not completed the reconfiguration in response to it being detected that a response message to the first reconfiguration message has not been received before the cell update message is received.

11. The method according to claim 8, wherein the first configuration and the second configuration are radio link control configurations.

12. The method according to claim 8, further comprising detecting whether or not a response to the second reconfiguration message is received, wherein the response indicates that the reconfiguration for the terminal in the second cell is established;

stopping, in response to the terminal not completing the reconfiguration and the cell update message being received, a data transmission to the terminal;

continuing the data transmission in response to it being detected that the response to the second reconfiguration message is received.

13. The method according to claim 12, further comprising deciding, based on the first configuration and the second configuration, if a ciphering has to be reconfigured for the terminal;

triggering, if it is decided that the ciphering has to be reconfigured, a reconfiguration of the ciphering if it is detected that the response to the second reconfiguration message is received.

14. The apparatus of claim 8, wherein the first capability of the first cell is enhanced-forward access channel configuration and wherein the second cell does not have the enhanced-forward access channel configured.

15. A method, comprising:

receiving, by a user equipment, a first reconfiguration message from a network, wherein the first reconfiguration message provides a first configuration of a first radio bearer in a first cell, the receiving part of a radio resource control reconfiguration procedure for a reconfiguration of the radio resource control by the user equipment in the first cell and is based on a first capability of a forward access channel of the first cell;

transmitting, prior to completing the radio resource control reconfiguration procedure, a cell update message indicating that the user equipment performed a cell update to a second cell different from the first cell;

receiving, in response to a determination by the network the second cell has a same capability of the forward access channel as the first capability of the forward access channel of the first cell, a cell update confirmation from the network with radio link control information for the cell update to the second cell; and otherwise, in response to a determination by the network the second cell has a second capability of the forward access channel different from the first capability of the forward access channel of the first cell, performing the following:

receiving a cell update confirmation message without radio link control information for the cell update to the second cell;

after completing the cell update procedure, transmitting a response indicating that a cell update to the second cell is confirmed; and receiving, subsequent to transmitting the response indicating the cell update to the second cell is confirmed, a second reconfiguration message, wherein the second reconfiguration message provides the second configuration of the second radio bearer in the second cell at least by providing the radio link control information for the cell update to the second cell.

16. The method according to claim 15, wherein transmitting a cell update message comprises checking for one or more of radio bearer mapping parameters and transport channel configuration parameters.

17. The method according to claim 15, wherein:

the method further comprises transmitting a response to the first reconfiguration message indicating radio bearer reconfiguration for the first cell is complete.

18. The method of claim 15, wherein the first capability of the first cell is enhanced-forward access channel configuration and wherein the second cell does not have the enhanced-forward access channel configured.

* * * * *